G. GEER.
Boot-Jacks.
No. 149,465. Patented April 7, 1874.
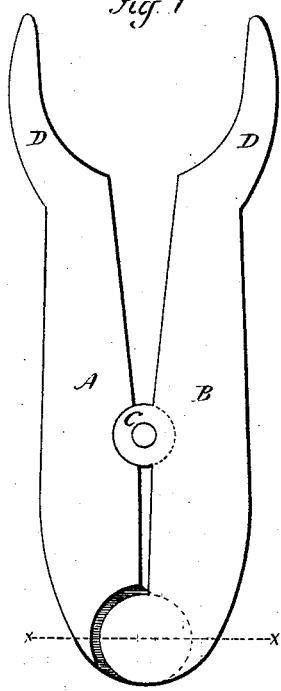
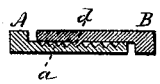
Witnesses.
J. H. Shumway
A. J. Tibbits
Geo. Geer
Inventor
By Atty
John S. Earle

UNITED STATES PATENT OFFICE.

GEORGE GEER, OF MERIDEN, CONNECTICUT, ASSIGNOR TO CHARLES PARKER, OF SAME PLACE.

IMPROVEMENT IN BOOT-JACKS.

Specification forming part of Letters Patent No. 149,465, dated April 7, 1874; application filed March 5, 1874.

*To all whom it may concern:*

Be it known that I, GEORGE GEER, of Meriden, in the county of New Haven and State of Connecticut, have invented a new Improvement in Boot-Jacks; and I do hereby declare the following, when taken in connection with the accompanying drawings and the letters of reference marked thereon, to be a full, clear, and exact description of the same, and which said drawings constitute part of this specification, and represent, in—

Figure 1, a top view; and in Fig. 2, a transverse section on line $x\ x$.

This invention relates to an improvement in boot-jacks, which are made adjustable to heels of different widths; and it consists in two parts or jaws, pivoted together, and at a convenient point distant from the pivot the two parts overlap each other, the meeting surfaces serrated, so that the teeth or projections of one part will set into corresponding recesses in the other part, and hold the two parts in any position in which they may be set.

A is one part, B the other part, pivoted together preferably near the center at C, and so that the horns D D may be brought nearer to or moved farther from each other by turning the said pivot. Preferably at the lower end, the part B is made to overlap the other part, A, as seen in Fig. 2. The meeting surfaces of these two parts, or one of them, is serrated, or has several teeth $a$ formed thereon, and the other part has corresponding teeth, or may be a single tooth, $d$, which will set into a corresponding recess or recesses between the teeth of the other part. The pivot allows the separation of the two parts, so that the teeth may ride over each other and be set into any desired position to open or close the horns D, and when that desired position is attained and the boot-jack placed upon the floor, the foot resting on the boot-jack holds the parts firmly in their set position. If preferred, the pivot may be a set-screw, so that by loosening the set-screw the parts may be adjusted, and when the screw is reset the teeth on the two parts will be firmly held together, and not depend upon the foot to hold them. The position of the pivot and of the serrated surfaces or teeth may be relatively changed—that is to say, the overlapping parts with the teeth may be between the pivot and the horns, or at other different relative locations, it only being essential to this invention that there be the two parts pivoted together, and the overlapping serrated surfaces to hold the parts when adjusted.

I claim as my invention—

A boot-jack consisting of the two parts A B, with their respective horns D, the said two parts pivoted together, and overlapping each other at a point distant from the pivot, and the overlapping surfaces toothed or serrated, substantially as described.

GEORGE GEER.

Witnesses:
JOSEPH H. BECKETT,
RALPH A. PALMER.